United States Patent
Song et al.

(10) Patent No.: US 12,350,999 B2
(45) Date of Patent: Jul. 8, 2025

(54) METHOD FOR CONTROLLING ELECTRIC HEATER OF VEHICULAR HVAC SYSTEM

(71) Applicants: HYUNDAI MOTOR COMPANY, Seoul (KR); KIA CORPORATION, Seoul (KR)

(72) Inventors: Dae Hyun Song, Hwaseong-si (KR); Chang Gi Ryu, Seoul (KR); Woo Jin Lee, Incheon (KR); Dong Ju Ko, Hwaseong-si (KR); Hyun Hun Choi, Hwaseong-si (KR); Chun Kyu Kwon, Hwaseong-si (KR); In Uk Ko, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 242 days.

(21) Appl. No.: 18/128,446

(22) Filed: Mar. 30, 2023

(65) Prior Publication Data
US 2024/0109397 A1    Apr. 4, 2024

(30) Foreign Application Priority Data
Sep. 29, 2022   (KR) .................... 10-2022-0124643

(51) Int. Cl.
*B60B 3/00*    (2006.01)
*B60H 1/00*    (2006.01)
(52) U.S. Cl.
CPC ......... *B60H 1/008* (2013.01); *B60H 1/00278* (2013.01)

(58) Field of Classification Search
CPC .................... B60H 1/008; B60H 1/00278
USPC ........................................... 165/42
See application file for complete search history.

(56) References Cited

FOREIGN PATENT DOCUMENTS

| CN | 109228962 B | * | 7/2021 |
| FR | 2966580 A1 | * | 4/2012 |
| KR | 20200060755 A | * | 6/2020 |
| WO | WO2019062935 A1 | * | 4/2019 |
| WO | WO2019062951 A1 | * | 4/2019 |

* cited by examiner

Primary Examiner — Davis D Hwu
(74) Attorney, Agent, or Firm — MCDONNELL BOEHNEN HULBERT & BERGHOFF LLP

(57) ABSTRACT

A method for controlling an electric heater of a vehicular heating, ventilation, and air conditioning (HVAC) system includes turning on the electric heater; determining whether an ambient air temperature of a vehicle is higher than or equal to a threshold ambient air temperature, and a battery temperature is lower than or equal to a threshold battery temperature; determining whether battery efficiency is lower than or equal to threshold efficiency when the ambient air temperature of the vehicle is higher than or equal to the threshold ambient air temperature, and the battery temperature is lower than or equal to the threshold battery temperature; and turning off the electric heater when the battery efficiency is lower than or equal to the threshold efficiency, wherein the electric heater is configured to receive electric energy from the battery.

14 Claims, 7 Drawing Sheets

METHOD FOR CONTROLLING ELECTRIC HEATER OF VEHICULAR HVAC SYSTEM

CROSS REFERENCE TO RELATED APPLICATIONS

This application is based on and claims the benefit of priority to Korean Patent Application No. 10-2022-0124643, filed on Sep. 29, 2022, in the Korean Intellectual Property Office, the disclosure of which is incorporated herein in its entirety by reference.

TECHNICAL FIELD

The present disclosure relates to a method for controlling an electric heater of a vehicular heating, ventilation, and air conditioning (HVAC) system, and more particularly, to a method for controlling an electric heater of a vehicular HVAC system designed to minimize the use of the electric heater in a condition in which battery efficiency is relatively low (the battery efficiency is lower than or equal to a threshold value), thereby maximizing the overall battery efficiency while the vehicle is driving, and thus improving energy efficiency of the vehicle and increasing all electric range (AER) of the vehicle.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven by using fuel cells or electricity as a power source and hybrid vehicles which are driven by using an engine and a battery.

Electric vehicles or hybrid vehicles include a heating, ventilation, and air conditioning (HVAC) system for air conditioning in a passenger compartment. The HVAC system include an evaporator and a positive temperature coefficient (PTC) heater. The evaporator and the PTC heater may be disposed in an HVAC housing. The evaporator may be configured to cool the air, and the PTC heater may be configured to heat the air. As electric energy is applied to the PTC heater, the PTC heater may generate heat. The PTC heater may be divided into a high-voltage PTC heater and a low-voltage PTC heater.

A hybrid vehicle such as a hybrid electric vehicle (HEV) and a plug-in hybrid electric vehicle (PHEV) includes a heater core generating heat using an engine coolant in the HVAC housing. The heater core may be disposed on the downstream side of the evaporator, and the PTC heater may be adjacent to the heater core. The hybrid vehicle may employ a low-voltage PTC heater. The low-voltage PTC heater may continuously operate until a temperature of the engine coolant reaches a threshold value. When the output of a low-voltage DC-DC converter (LDC) is lower than or equal to an allowable output amount, the low-voltage PTC heater may operate, and when it is higher than the allowable output amount, the low-voltage PTC heater may not operate.

An electric vehicle may employ a high-voltage PTC heater. The high-voltage PTC heater may be controlled at a predetermined duty cycle, until a temperature of air directed to the passenger compartment reaches a target temperature.

Meanwhile, since power consumption of the PTC heater is relatively high, a depth of discharge or a discharge amount of a battery may relatively increase when the PTC heater operates. Accordingly, energy efficiency of the vehicle may be lowered, and all electric range (AER) of the vehicle may be reduced. In particular, when the PTC heater operates in a condition in which battery efficiency is lower than or equal to a threshold value (for example, 90%), the overall battery efficiency may rapidly degrade while the vehicle is driving. Here, the condition in which the battery efficiency is lower than or equal to the threshold value (for example, 90%) is as follows: the temperature of the battery is relatively low; the state of charge (SoC) of the battery is low; and the discharge amount of the battery is excessive (rapid acceleration, a steep ramp, high-speed driving, etc.).

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a method for controlling an electric heater of a vehicular heating, ventilation, and air conditioning (HVAC) system designed to turn off the electric heater when battery efficiency becomes lower than or equal to threshold efficiency in a state in which the HVAC system operates in a heating mode and the electric heater is turned on, thereby relatively reducing a discharge amount of the battery and maximizing the overall battery efficiency while the vehicle is driving, and thus improving energy efficiency of the vehicle and increasing all electric range (AER) of the vehicle.

According to an aspect of the present disclosure, a method for controlling an electric heater of a vehicular HVAC system may include turning on the electric heater, determining whether an ambient air temperature of a vehicle is higher than or equal to a threshold ambient air temperature, and a battery temperature is lower than or equal to a threshold battery temperature, determining whether battery efficiency is lower than or equal to threshold efficiency when the ambient air temperature of the vehicle is higher than or equal to the threshold ambient air temperature, and the battery temperature is lower than or equal to the threshold battery temperature, and turning off the electric heater when the battery efficiency is lower than or equal to the threshold efficiency. The electric heater may be configured to receive electric energy from the battery.

It may be determined whether the battery efficiency is lower than or equal to the threshold efficiency by comparing the battery temperature with a plurality of reference temperatures, and comparing an instantaneous discharge current of the battery with a plurality of reference discharge currents.

The battery efficiency may be classified based on the plurality of reference temperatures, and the plurality of reference temperatures may be divided from a minimum reference temperature to a maximum reference temperature. The maximum reference temperature may be lower than or equal to the threshold battery temperature.

The plurality of reference discharge currents may correspond to the plurality of reference temperatures, respectively.

The electric heater may be turned off when the battery temperature is lower than or equal to each reference temperature, and the instantaneous discharge current of the battery is higher than or equal to a reference discharge current corresponding to each reference temperature.

The method may further include determining whether SoC of the battery is lower than or equal to a reference SoC when the battery temperature is lower than or equal to each reference temperature, and the instantaneous discharge current of the battery is higher than or equal to a reference discharge current corresponding to each reference temperature. The electric heater may be turned off when the SoC of the battery is lower than or equal to the reference SoC.

It may be determined whether the battery efficiency is lower than or equal to the threshold efficiency by comparing the battery temperature with a plurality of reference temperatures, and comparing an instantaneous discharge rate of the battery with a plurality of reference instantaneous discharge rates.

The plurality of reference instantaneous discharge rates may correspond to the plurality of reference temperatures, respectively.

The electric heater may be turned off when the battery temperature is lower than or equal to each reference temperature, and the instantaneous discharge rate of the battery is higher than or equal to a reference instantaneous discharge rate corresponding to each reference temperature.

The method may further include determining whether SoC of the battery is lower than or equal to a reference SoC when the battery temperature is lower than or equal to each reference temperature, and the instantaneous discharge rate of the battery is higher than or equal to a reference instantaneous discharge rate corresponding to each reference temperature. The electric heater may be turned off when the SoC of the battery is lower than or equal to the reference SoC.

The method may further include determining whether a heating condition of the HVAC system corresponds to a warm-up condition or a stable condition after the electric heater is turned off.

The warm-up condition may refer to a condition in which a temperature change rate of supply air, which is supplied to a passenger compartment by the HVAC system, is higher than or equal to a reference temperature change rate.

The method may further include determining whether a temperature increase rate of supply air, which is supplied to a passenger compartment by the HVAC system, is lower than or equal to a threshold temperature increase rate when the heating condition of the HVAC system corresponds to the warm-up condition, and turning on the electric heater when the temperature increase rate of the supply air is lower than or equal to the threshold temperature increase rate.

The stable condition may refer to a condition in which a temperature change rate of supply air, which is supplied to a passenger compartment by the HVAC system, is lower than a reference temperature change rate.

The method may further include determining whether a temperature decrease rate of supply air, which is supplied to a passenger compartment by the HVAC system, is higher than or equal to a threshold temperature decrease rate when the heating condition of the HVAC system corresponds to the stable condition, and turning on the electric heater when the temperature decrease rate of the supply air is higher than or equal to the threshold temperature decrease rate.

BRIEF DESCRIPTION OF THE FIGURES

The above and other objects, features and advantages of the present disclosure will be more apparent from the following detailed description taken in conjunction with the accompanying drawings:

FIG. 5 illustrates a process of turning off an electric heater in a state in which a vehicular HVAC system according to an exemplary embodiment of the present disclosure operates in a heating mode and the electric heater is turned on;

DETAILED DESCRIPTION

Figure 1:
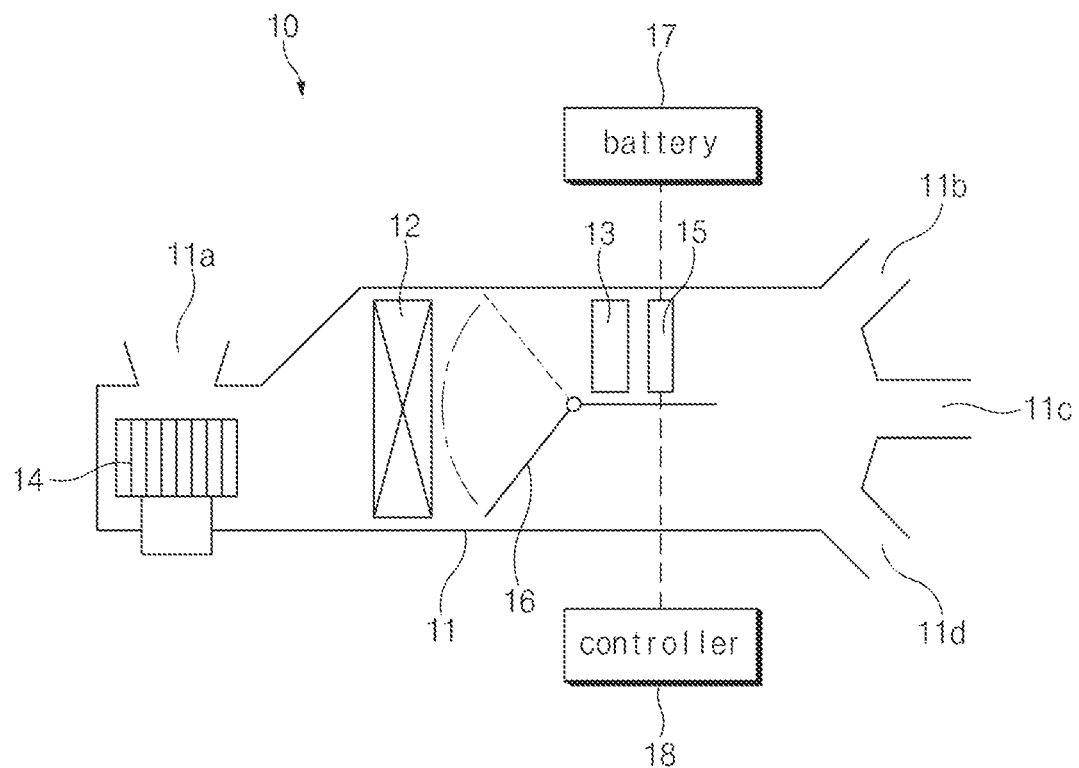
FIG. 1 illustrates a vehicular heating, ventilation, and air conditioning (HVAC) system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicular heating, ventilation, and air conditioning (HVAC) system 10 according to an exemplary embodiment of the present disclosure may include an HVAC housing 11, an evaporator 12 disposed in the HVAC housing 11, a heat exchanger 13 disposed on the downstream side of the evaporator 12 in the HVAC housing 11, and an electric heater 15 disposed on the downstream side of the heat exchanger 13.

The HVAC housing 11 may include an inlet 11a through which air is allowed to flow into the HVAC housing 11, and a plurality of outlets 11b, 11c, and 11d through which the air is allowed to flow from the HVAC housing 11 to a passenger compartment. An air blower 14 may be disposed adjacent to the inlet 11a of the HVAC housing 11. The air may be directed into the HVAC housing 11 through the inlet 11a by the air blower 14, pass through the HVAC housing 11, and be supplied from the HVAC housing 11 to the passenger compartment through the plurality of outlets 11b, 11c, and 11d.

The evaporator 12 may be configured to cool the air passing through the HVAC housing 11. The evaporator 12 may be fluidly connected to a refrigerant circuit through which a refrigerant circulates.

The heat exchanger 13 may be configured to heat the air passing through the HVAC housing 11. The air heated by the heat exchanger 13 may be directed to the passenger compartment through the outlets 11b, 11c, and 11d of the HVAC housing 11.

According to an exemplary embodiment, the heat exchanger 13 may be a heater core through which an engine coolant passes, and the heater core may be used in hybrid vehicles or electric vehicles.

According to another exemplary embodiment, the heat exchanger 13 may be an interior condenser through which the refrigerant passes, and the interior condenser may be fluidly connected to the evaporator 12 through the refrigerant circuit. The refrigerant may be condensed in the interior condenser to thereby heat the air passing through the HVAC housing 11. The interior condenser may be used in electric vehicles.

An air mixing door 16 may be disposed to be movable between the evaporator 12 and the heat exchanger 13. The air cooled by the evaporator 12 and the air heated by the heat exchanger 13 may be properly mixed by the movement of the air mixing door 16.

The electric heater 15 may be electrically connected to a battery 17. Accordingly, the electric heater 15 may receive electric energy from the battery 17. To heat the passenger compartment, when the HVAC system 10 operates in a heating mode and the electric energy is applied to the electric heater 15, the electric heater 15 may be configured to generate heat. The electric heater 15 may heat the air passing through the HVAC housing 11 using the heat generated by the electric energy.

According to an exemplary embodiment, the electric heater 15 may be a positive temperature coefficient (PTC) heater of which resistance increases significantly with a temperature increase. Specifically, a PTC material used in the PTC heater is a material whose resistance increases as the temperature rises. Since the resistance increases with the rising temperature, a current may be cut off when the temperature of the PTC material reaches a predetermined temperature. The electric heater 15 may be a low-voltage PTC heater or a high-voltage PTC heater.

The operation of the electric heater 15 may be controlled by a controller 18, and the controller 18 may include a processor and a memory. The processor may be programmed to receive instructions stored in the memory and transmit the instructions to the electric heater 15. The memory may be a data store such as hard disk drive, a solid state drive, a server, a volatile storage medium, and a non-volatile storage medium.

Figure 2:
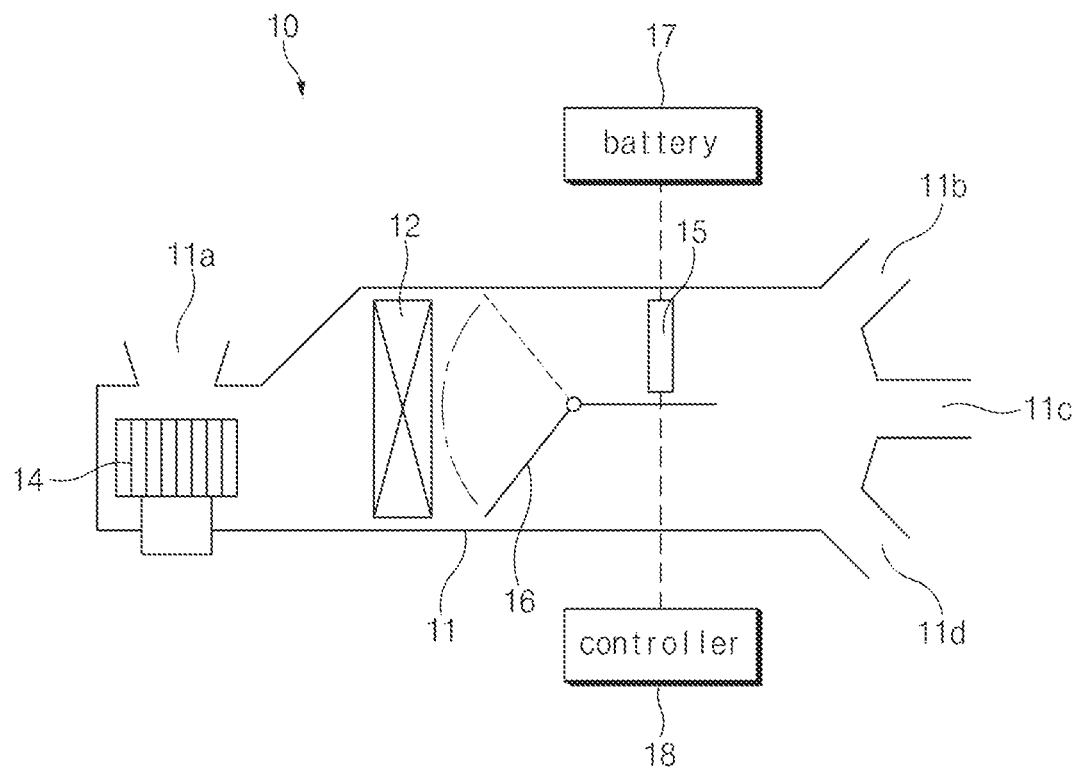
FIG. 2 illustrates a vehicular HVAC system according to another exemplary embodiment of the present disclosure.

Referring to FIG. 2, in the vehicular HVAC system 10 according to another exemplary embodiment of the present disclosure, the heat exchanger 13 such as the heater core or the interior condenser may be removed, and the electric heater 15 may be disposed on the downstream side of the evaporator 12 in the HVAC housing 11. In the exemplary embodiment illustrated in FIG. 2, there is no heat source other than the electric heater 15 as in an electric vehicle. The other configuration in the exemplary embodiment illustrated in FIG. 2, excepting the removal of the heat exchanger 13, may be the same as that in the exemplary embodiment illustrated in FIG. 1.

When the vehicular HVAC system 10 according to exemplary embodiments of the present disclosure operates in the heating mode to heat the passenger compartment, the controller 18 may turn on the electric heater 15.

Figure 3:
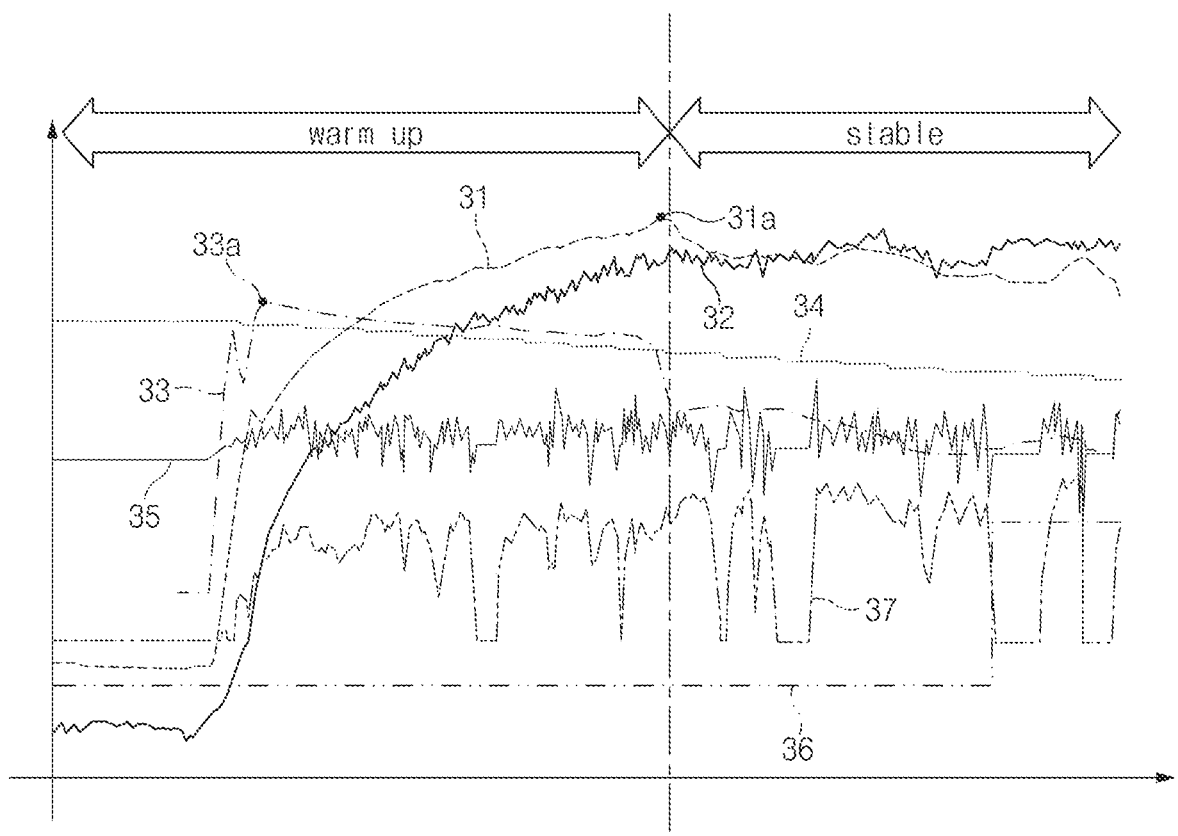
FIG. 3 illustrates a graph of a temperature of supply air, a temperature of a passenger compartment, power consumption of an electric heater, state of charge (SoC) of a battery, a current amount of the battery, and a temperature of the battery when a vehicular HVAC system according to an exemplary embodiment of the present disclosure operates in a heating mode.

Referring to FIG. 3, as the electric heater 15 operates, a temperature 31 of air (hereinafter referred to as "supply air") supplied from the HVAC housing 11 to the passenger compartment may change at a predetermined rate of temperature change after the temperature 31 of the supply air increases to a peak temperature 31a. As the temperature 31 of the supply air increases, a temperature 32 of the passenger compartment may increase accordingly. As the temperature 31 of the supply air changes at a predetermined rate of temperature change, the temperature 32 of the passenger compartment may change at a predetermined rate of temperature change. A power consumption 33 of the electric heater 15 may rapidly increase to a peak power consumption 33a and then gradually decrease, and state of charge (SoC) 34 of the battery 17 may gradually decrease.

Referring to FIG. 3, when the vehicular HVAC system 10 operates in the heating mode, a heating condition of the vehicular HVAC system 10 or an interior condition of the passenger compartment may be divided into a warm-up condition and a stable condition. The warm-up condition refers to a condition in which a rate of change in the temperature 31 of the supply air and/or a rate of change in the temperature 32 of the passenger compartment is higher than or equal to a reference temperature change rate, and the stable condition refers to a condition in which the rate of change in the temperature 31 of the supply air and/or the rate of change in the temperature 32 of the passenger compartment is lower than the reference temperature change rate. A current amount or discharge amount 35 of the battery 17 may vary at various rates. As the SoC 34 of the battery 17 decreases, a temperature 36 of the battery 17 may remain at a lower limit and then increase to an upper limit in the stable condition. A vehicle speed 37 may vary at various rates.

Figure 4:
FIG. 4 illustrates a battery efficiency table used in a method for controlling an electric heater of a vehicular HVAC system according to an exemplary embodiment of the present disclosure.

FIG. 4 illustrates a battery efficiency table indicating battery efficiency of an electric vehicle. Battery efficiency Bn may be reduced in the following conditions: the temperature of the battery is relatively low; the SoC of the battery is relatively low, and the discharge current of the battery is relatively high. The battery efficiency Bn may be increased in the following conditions: the temperature of the battery is relatively high; the SoC of the battery is relatively high; and the discharge current of the battery is relatively low.

Referring to FIG. 4, the battery efficiency Bn may be classified according to a plurality of reference temperatures Bt1, Bt2, Bt3, Bt4, and Bt5. The plurality of reference temperatures Bt1, Bt2, Bt3, Bt4, and Bt5 may include a first reference temperature Bt1, a second reference temperature Bt2 higher than the first reference temperature Bt1, a third reference temperature Bt3 higher than the second reference temperature Bt2, a fourth reference temperature Bt4 higher than the third reference temperature Bt3, and a fifth reference temperature Bt5 higher than the fourth reference temperature Bt4.

Referring to FIG. 4, when the temperature of the battery 17 is lower than or equal to the first reference temperature Bt1, and the discharge current of the battery 17 is lower than or equal to 5 A, the battery efficiency Bn may be in Grade 1 of 96%≤Bn. When the temperature of the battery 17 exceeds the first reference temperature Bt1 and is lower than or equal to the fifth reference temperature Bt5, and the discharge current of the battery 17 is lower than or equal to 10 A, the battery efficiency Bn may be in Grade 1 of 96%≤Bn. When the temperature of the battery 17 exceeds the second reference temperature Bt2 and is lower than or equal to the fifth reference temperature Bt5, and the discharge current of the battery 17 is lower than or equal to 20 A, the battery efficiency Bn may be in Grade 1 of 96%≤Bn. When the temperature of the battery 17 exceeds the third reference temperature Bt3 and is lower than or equal to the fifth reference temperature Bt5, and the discharge current of the battery 17 is lower than or equal to 40 A, the battery efficiency Bn may be in Grade 1 of 96%≤Bn.

Referring to FIG. 4, when the temperature of the battery 17 is lower than or equal to the first reference temperature Bt1, and the discharge current of the battery 17 exceeds 5 A and is lower than or equal to 20 A, the battery efficiency Bn may be in Grade 2 of 90%≤Bn<96%. When the temperature of the battery 17 exceeds the first reference temperature Bt1 and is lower than or equal to the second reference temperature Bt2, and the discharge current of the battery 17 exceeds 10 A and is lower than or equal to 20 A, the battery efficiency Bn may be in Grade 2 of 90%≤Bn<96%. When the temperature of the battery 17 exceeds the second reference temperature Bt2 and is lower than or equal to the third reference temperature Bt3, and the discharge current of the battery 17 exceeds 20 A and is lower than or equal to 40 A, the battery efficiency Bn may be in Grade 2 of 90%≤Bn<96%. In addition, when the temperature of the battery 17 exceeds the second reference temperature Bt2 and is lower than or equal to the third reference temperature Bt3, the discharge current of the battery 17 exceeds 40 A and is lower than or equal to 60 A, and the SoC of the battery 17 exceeds 60% and is lower than or equal to 70%, the battery efficiency Bn may be in Grade 2 of 90%≤Bn<96%. When the temperature of the battery 17 exceeds the third reference temperature Bt3 and is lower than or equal to the fifth reference temperature Bt5, and the discharge current of the battery 17 exceeds 40 A and is lower than or equal to 100 A, the battery efficiency Bn may be in Grade 2 of 90%≤Bn<96%.

Referring to FIG. 4, when the temperature of the battery 17 is lower than or equal to the first reference temperature Bt1, the discharge current of the battery 17 exceeds 20 A and is lower than or equal to 40 A, and the SoC of the battery 17 exceeds 50% and is lower than or equal to 70%, the battery efficiency Bn may be in Grade 3 of 85%≤Bn<90%. When the temperature of the battery 17 exceeds the first reference temperature Bt1 and is lower than or equal to the second reference temperature Bt2, and the discharge current of the battery 17 exceeds 20 A and is lower than or equal to 40 A, the battery efficiency Bn may be in Grade 3 of 85%≤Bn<90%. When the temperature of the battery 17 exceeds the first reference temperature Bt1 and is lower than or equal to the second reference temperature Bt2, the discharge current of the battery 17 exceeds 40 A and is lower than or equal to 60 A, and the SoC of the battery 17 exceeds 60% and is lower than or equal to 70%, the battery efficiency Bn may be in Grade 3 of 85%≤Bn<90%. When the temperature of the battery 17 exceeds the second reference temperature Bt2 and is lower than or equal to the third reference temperature Bt3, the discharge current of the battery 17 exceeds 40 A and is lower than or equal to 60 A, and the SoC of the battery 17 is higher than or equal to 40% and is lower than or equal to 60%, the battery efficiency Bn may be in Grade 3 of 85%≤Bn<90%. When the temperature of the battery 17 exceeds the second reference temperature Bt2 and is lower than or equal to the third reference temperature Bt3, and the discharge current of the battery 17 exceeds 60 A and is lower than or equal to 80 A, the battery efficiency Bn may be in Grade 3 of 85%≤Bn<90%. When the temperature of the battery 17 exceeds the second reference temperature Bt2 and is lower than or equal to the third reference temperature Bt3, the discharge current of the battery 17 exceeds 80 A and is lower than or equal to 100 A, and the SoC of the battery 17 exceeds 60% and is lower than or equal to 70%, the battery efficiency Bn may be in Grade 3 of 85%≤Bn<90%. When the temperature of the battery 17 exceeds the third reference temperature Bt3 and is lower than or equal to the fifth reference temperature Bt5, and the discharge current of the battery 17 exceeds 100 A and is lower than or equal to 150 A, the battery efficiency Bn may be in Grade 3 of 85%≤Bn<90%.

Referring to FIG. 4, when the temperature of the battery 17 is lower than or equal to the first reference temperature Bt1, the discharge current of the battery 17 exceeds 20 A and is lower than or equal to 40 A, and the SoC of the battery 17 is lower than or equal to 50%, the battery efficiency Bn may be in Grade 4 of 80%≤Bn<85%. When the temperature of the battery 17 is lower than or equal to the first reference temperature Bt1, the discharge current of the battery 17 exceeds 40 A and is lower than or equal to 60 A, and the SoC of the battery 17 exceeds 40% and is lower than or equal to 70%, the battery efficiency Bn may be in Grade 4 of 80%≤Bn<85%. When the temperature of the battery 17 exceeds the first reference temperature Bt1 and is lower than or equal to the second reference temperature Bt2, the discharge current of the battery 17 exceeds 40 A and is lower than or equal to 60 A, and the SoC of the battery 17 is lower than or equal to 60%, the battery efficiency Bn may be in Grade 4 of 80%≤Bn<85%. When the temperature of the battery 17 exceeds the first reference temperature Bt1 and is lower than or equal to the second reference temperature Bt2, and the discharge current of the battery 17 exceeds 60 A and is lower than or equal to 80 A, the battery efficiency Bn may be in Grade 4 of 80%≤Bn<85%. When the temperature of the battery 17 exceeds the second reference temperature Bt2 and is lower than or equal to the third reference temperature Bt3, the discharge current of the battery 17 exceeds 80 A and is lower than or equal to 100 A, and the SoC of the battery 17 is lower than or equal to 60%, the battery efficiency Bn may be in Grade 4 of 80%≤Bn<85%.

Referring to FIG. 4, when the temperature of the battery 17 is lower than or equal to the first reference temperature Bt1, the discharge current of the battery 17 exceeds 40 A and is lower than or equal to 60 A, and the SoC of the battery 17 is lower than or equal to 40%, the battery efficiency Bn may be in Grade 5 of Bn<80%. When the temperature of the battery 17 is lower than or equal to the first reference temperature Bt1, and the discharge current of the battery 17 exceeds 60 A and is lower than or equal to 150 A, the battery efficiency Bn may be in Grade 5 of Bn<80%. When the temperature of the battery 17 exceeds the first reference temperature Bt1 and is lower than or equal to the second reference temperature Bt2, and the discharge current of the battery 17 exceeds 80 A and is lower than or equal to 150 A, the battery efficiency Bn may be in Grade 5 of Bn<80%. When the temperature of the battery 17 exceeds the second reference temperature Bt2 and is lower than or equal to the third reference temperature Bt3, and the discharge current of the battery 17 exceeds 100 A and is lower than or equal to 150 A, the battery efficiency Bn may be in Grade 5 of Bn<80%.

Figure 5:
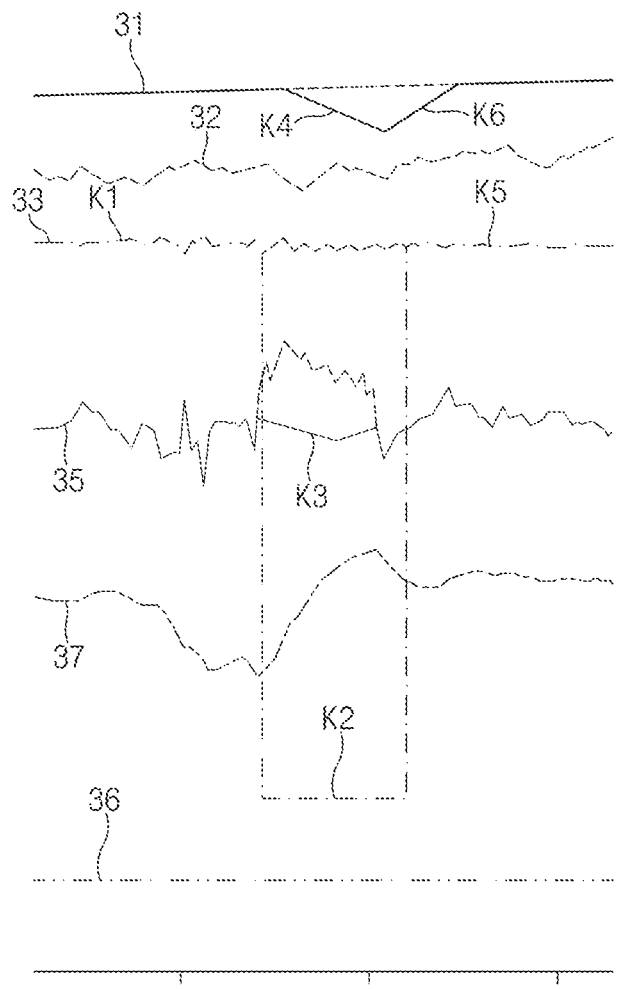

Referring to FIG. 5, in a state in which the vehicular HVAC system 10 operates in the heating mode (the warm-up condition and the stable condition) and the electric heater 15 is turned on (K1), the power consumption 33 of the electric heater 15 may be kept constant. When the battery efficiency is lower than or equal to threshold efficiency, the controller 18 may turn off the electric heater 15 (K2) so that the discharge amount 35 of the battery 17 may decrease (K3). With a predetermined time elapsed since the turn-off of the electric heater 15, when the temperature 31 of the supply air rapidly decreases (K4), the controller 18 may turn on the electric heater 15 again (K5) so that the temperature 31 of the supply air may increase (K6). In particular, when the battery efficiency is lower than or equal to the threshold efficiency regardless of the warm-up condition and the stable condition, the controller 18 may turn off the electric heater 15.

Figure 6:
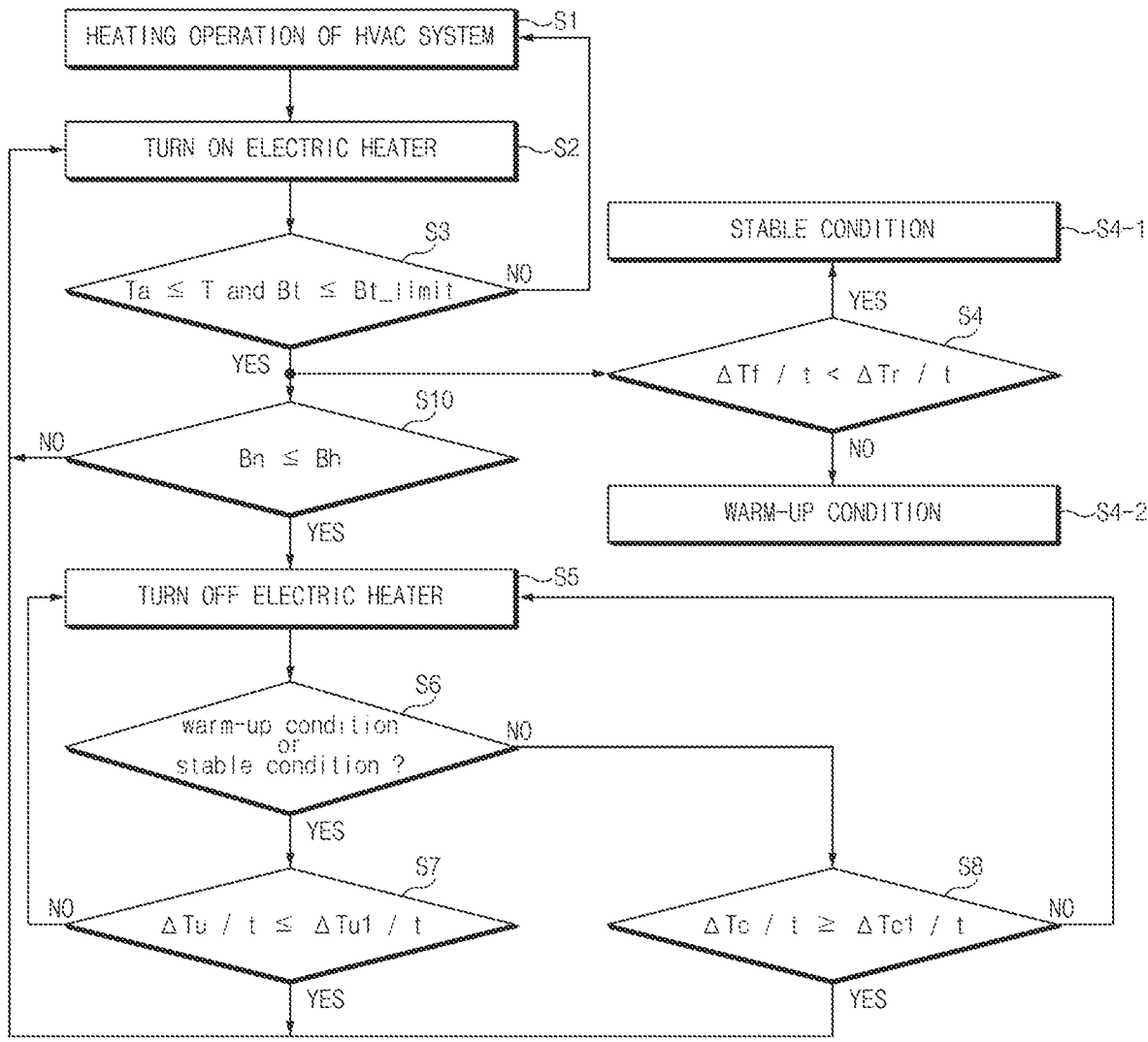
FIG. 6 illustrates a flowchart of a method for controlling an electric heater of a vehicular HVAC system according to an exemplary embodiment of the present disclosure.

FIG. 6 illustrates a flowchart of a method for controlling an electric heater of a vehicular HVAC system according to an exemplary embodiment of the present disclosure.

Referring to FIG. 6, the vehicular HVAC system 10 may operate in a heating mode (S1), and then the controller 18 may turn on the electric heater 15 (S2). As the electric heater 15 is turned on, a temperature of the supply air may increase.

After the electric heater 15 is turned on, the controller 18 may determine whether an ambient air temperature T of the vehicle is higher than or equal to a threshold ambient air temperature Ta, and a battery temperature Bt is lower than or equal to a threshold battery temperature Bt_limit (S3).

The threshold ambient air temperature Ta may be an ambient air temperature for determining whether heating of the passenger compartment is to be prioritized. For example, the threshold ambient air temperature Ta may be −10° C. When the ambient air temperature T is lower than the threshold ambient air temperature Ta, the heating of the passenger compartment may be prioritized so that the electric heater 15 may be selectively activated based on a heating temperature set by a user. When the ambient air temperature T is higher than or equal to the threshold ambient air temperature Ta, the electric heater 15 may be controlled based on the battery efficiency Bn.

The threshold battery temperature Bt_limit may be a battery temperature for determining whether the battery efficiency Bn is lower than or equal to the threshold efficiency Bh. For example, the threshold battery temperature Bt_limit may be 35° C., and the threshold efficiency Bh may be 90%. When the battery temperature Bt is higher than the threshold battery temperature Bt_limit, the battery efficiency Bn may increase above the threshold efficiency Bh so that the electric heater 15 may be selectively activated based on the heating temperature set by the user. When the battery temperature Bt is lower than or equal to the threshold battery temperature Bt_limit, the battery efficiency Bn may be lowered below the threshold efficiency Bh so that the electric heater 15 may be controlled based on the battery efficiency Bn.

According to an exemplary embodiment of the present disclosure, when it is determined in S3 that the ambient air temperature T of the vehicle is higher than or equal to the threshold ambient air temperature Ta, and the battery temperature Bt is lower than or equal to the threshold battery temperature Bt_limit, the controller 18 may determine whether a rate ΔTf/t of change in the temperature of the supply air (temperature change rate ΔTf/t of the supply air) is lower than a reference temperature change rate ΔTr/t (S4).

The temperature change rate ΔTf/t of the supply air may be an amount of change in the temperature of the supply air for a predetermined time. Specifically, the temperature change rate ΔTf/t of the supply air may be the amount of change in the temperature of the supply air for one second.

The reference temperature change rate ΔTr/t may be a temperature change rate for determining whether the temperature change rate of the supply air meets the warm-up condition or the stable condition. For example, the reference temperature change rate ΔTr/t may be 2° C./sec. The warm-up condition refers to a condition in which the temperature 32 of the passenger compartment and the temperature 31 of the supply air gradually increase, and the stable condition refers to a condition in which the temperature 32 of the passenger compartment and the temperature 31 of the supply air are maintained at a constant rate of temperature change. When the temperature change rate ΔTf/t of the supply air is lower than the reference temperature change rate ΔTr/t, the controller 18 may determine that the heating condition of the HVAC system 10 or the interior condition of the passenger compartment corresponds to the stable condition (S4-1). When the temperature change rate ΔTf/t of the supply air is higher than or equal to the reference temperature change rate ΔTr/t, the controller 18 may determine that the heating condition of the HVAC system 10 or the interior condition of the passenger compartment corresponds to the warm-up condition (S4-2).

When it is determined in S3 that the ambient air temperature T of the vehicle is lower than the threshold ambient air temperature Ta, and the battery temperature Bt exceeds the threshold battery temperature Bt_limit, the method may return to S1 and the electric heater 15 may be turned on (S2).

When it is determined in S3 that the ambient air temperature T of the vehicle is higher than or equal to the threshold ambient air temperature Ta, and the battery temperature Bt is lower than or equal to the threshold battery temperature Bt_limit, the controller 18 may determine whether the battery efficiency Bn is lower than or equal to the threshold efficiency Bh (S10).

When it is determined in S10 that the battery efficiency Bn is lower than or equal to the threshold efficiency Bh, the controller 18 may turn off the electric heater 15 (S5). If the electric heater operates in a condition in which the battery efficiency is lower than or equal to the threshold efficiency, the power consumption of the battery may rapidly increase, and thus energy efficiency of the vehicle may be lowered and all electric range (AER) of the vehicle may be reduced. According to an exemplary embodiment of the present disclosure, when the battery efficiency Bn is lower than or equal to the threshold efficiency Bh, the electric heater 15 may be turned off so that a rapid increase in the power consumption of the battery 17 may be prevented, and thus the energy efficiency of the vehicle may be improved, and the AER of the vehicle may be relatively increased. In a condition in which the battery efficiency Bn is higher than the threshold efficiency Bh, even if the electric heater 15 operates, the power consumption of the battery 17 may not rapidly increase, and thus neither the energy efficiency of the vehicle nor the AER of the vehicle may be reduced.

After the electric heater 15 is turned off, the controller 18 may determine whether the heating condition of the HVAC system 10 or the interior condition of the passenger compartment corresponds to the warm-up condition or the stable condition (S6). Specifically, when the temperature change rate ΔTf/t of the supply air is higher than or equal to the reference temperature change rate ΔTr/t, the controller 18 may determine that the heating condition of the HVAC system 10 or the interior condition of the passenger compartment corresponds to the warm-up condition. When the temperature change rate $\Delta Tf/t$ of the supply air is lower than the reference temperature change rate $\Delta Tr/t$, the controller 18 may determine that the heating condition of the HVAC system 10 or the interior condition of the passenger compartment corresponds to the stable condition.

When it is determined in S6 that the heating condition of the HVAC system 10 or the interior condition of the passenger compartment corresponds to the warm-up condition, the controller 18 may determine whether a temperature increase rate $\Delta Tu/t$ of the supply air is lower than or equal to a threshold temperature increase rate $\Delta Tu1/t$ after a predetermined time has elapsed (S7). The threshold temperature increase rate $\Delta Tu1/t$ may be a temperature increase rate for determining whether the temperature increase rate of the supply air meets the warm-up condition in a state in which the heating condition of the HVAC system 10 or the interior condition of the passenger compartment corresponds to the warm-up condition and the electric heater 15 is turned off. For example, the threshold temperature increase rate $\Delta Tu1/t$ may be 3° C./sec. When the temperature increase rate $\Delta Tu/t$ of the supply air is lower than or equal to the threshold temperature increase rate $\Delta Tu1/t$, it may be determined that the temperature increase rate of the supply air does not meet the warm-up condition, and accordingly the controller 18 may turn on the electric heater 15 to cause the temperature increase rate of the supply air to meet the warm-up condition. When the temperature increase rate $\Delta Tu/t$ of the supply air is higher than the threshold temperature increase rate $\Delta Tu1/t$, it may be determined that the temperature increase rate of the supply air meets the warm-up condition, and accordingly the controller 18 may keep the electric heater 15 turned off.

When it is determined in S6 that the heating condition of the HVAC system 10 or the interior condition of the passenger compartment corresponds to the stable condition, the controller 18 may determine whether a temperature decrease rate $\Delta Tc/t$ of the supply air is higher than or equal to a threshold temperature decrease rate $\Delta Tc1/t$ after a predetermined time has elapsed (S8). The threshold temperature decrease rate $\Delta Tc1/t$ may be a temperature decrease rate for determining whether the temperature decrease rate of the supply air meets the stable condition in a state in which the heating condition of the HVAC system 10 or the interior condition of the passenger compartment corresponds to the stable condition and the electric heater 15 is turned off. For example, the threshold temperature decrease rate $\Delta Tc1/t$ may be 3° C., which is perceptible to an occupant. When the temperature decrease rate $\Delta Tc/t$ of the supply air is higher than or equal to the threshold temperature decrease rate $\Delta Tc1/t$, it may be determined that the temperature decrease rate of the supply air does not meet the stable condition, and accordingly the controller 18 may turn on the electric heater 15 to cause the temperature decrease rate of the supply air to meet the stable condition. When the temperature decrease rate $\Delta Tc/t$ of the supply air is lower than the threshold temperature decrease rate $\Delta Tc1/t$, it may be determined that the temperature decrease rate of the supply air meets the stable condition, and accordingly the controller 18 may keep the electric heater 15 turned off.

Figure 7:
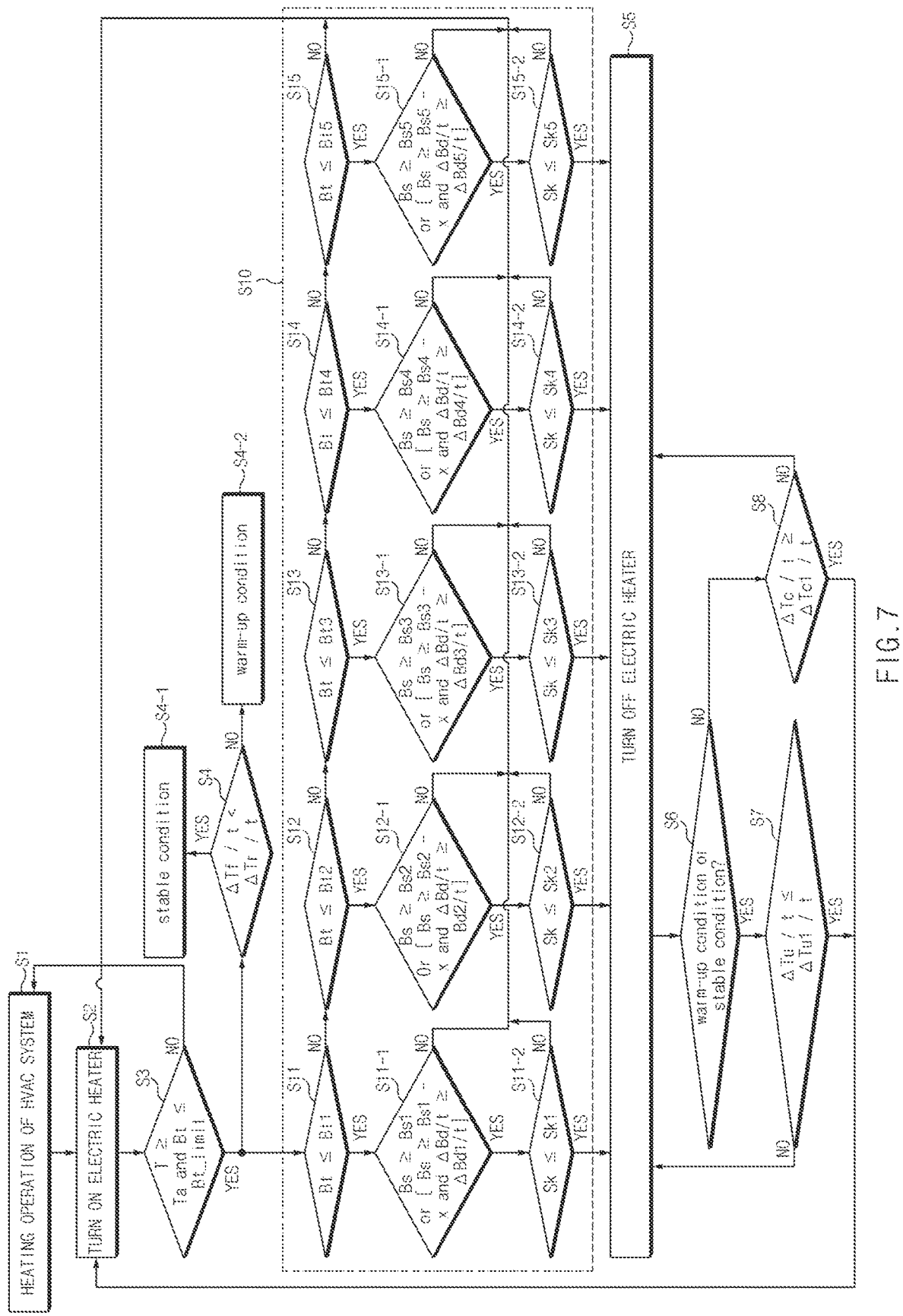
FIG. 7 illustrates a flowchart of details of the turn-off of an electric heater in a condition in which battery efficiency is lower than or equal to threshold efficiency.

FIG. 7 illustrates a flowchart of details of the turn-off of an electric heater in a condition in which the battery efficiency Bn is lower than or equal to the threshold efficiency Bh.

Referring to FIG. 7, when it is determined in S3 that the ambient air temperature T of the vehicle is higher than or equal to the threshold ambient air temperature Ta, and the battery temperature Bt is lower than or equal to the threshold battery temperature Bt_limit, it may be determined whether the battery efficiency Bn is lower than or equal to the threshold efficiency Bh by comparing the battery temperature Bt with the plurality of reference temperatures Bt1, Bt2, Bt3, Bt4, and Bt5, and comparing an instantaneous discharge current Bs of the battery with a plurality of reference discharge currents Bs1, Bs2, Bs3, Bs4, and Bs5, or comparing an instantaneous discharge rate $\Delta Bd/t$ of the battery with a plurality of reference instantaneous discharge rates $\Delta Bd1/t$, $\Delta Bd2/t$, $\Delta Bd3/t$, $\Delta Bd4/t$, and $\Delta Bd5/t$.

The plurality of reference temperatures Bt1, Bt2, Bt3, Bt4, and Bt5 may be lower than or equal to the threshold battery temperature Bt_limit. The plurality of reference discharge currents Bs1, Bs2, Bs3, Bs4, and Bs5 may correspond to the plurality of reference temperatures Bt1, Bt2, Bt3, Bt4, and Bt5, respectively, and the plurality of reference instantaneous discharge rates $\Delta Bd1/t$, $\Delta Bd2/t$, $\Delta Bd3/t$, $\Delta Bd4/t$, and $\Delta Bd5/t$ may correspond to the plurality of reference temperatures Bt1, Bt2, Bt3, Bt4, and Bt5, respectively.

Referring to FIG. 4, the battery efficiency Bn may be classified according to the plurality of reference temperatures Bt1, Bt2, Bt3, Bt4, and Bt5, and the plurality of reference temperatures Bt1, Bt2, Bt3, Bt4, and Bt5 may be divided from a minimum reference temperature Bt1 to a maximum reference temperature Bt5. The maximum reference temperature Bt5 may be lower than or equal to the threshold battery temperature Bt_limit.

When it is determined in S3 that the ambient air temperature T of the vehicle is higher than or equal to the threshold ambient air temperature Ta, and the battery temperature Bt is lower than or equal to the threshold battery temperature Bt_limit, it may be determined whether the battery temperature Bt is lower than or equal to the first reference temperature Bt1 (S11). The first reference temperature Bt1 may be a minimum reference temperature which is the lowest temperature among the plurality of reference temperatures Bt1, Bt2, Bt3, Bt4, and Bt5. For example, the first reference temperature Bt1 may be −7° C.

According to an exemplary embodiment, when it is determined in S11 that the battery temperature Bt is lower than or equal to the first reference temperature Bt1 which is the minimum reference temperature, it may be determined whether the instantaneous discharge current Bs of the battery is higher than or equal to a first reference discharge current Bs1 (S11-1). The first reference discharge current Bs1 may be a discharge current of the battery at which the battery efficiency Bn is reduced to be lower than or equal to the threshold efficiency Bh. For example, when the threshold efficiency Bh is 90%, the first reference discharge current Bs1 is 20 A, and the instantaneous discharge current Bs of the battery is lower than or equal to the first reference discharge current Bs1, the battery efficiency Bn may be lower than or equal to the threshold efficiency Bh.

According to another exemplary embodiment, when it is determined in S11 that the battery temperature Bt is lower than or equal to the first reference temperature Bt1 which is the minimum reference temperature, it may be determined whether the instantaneous discharge current Bs of the battery is higher than or equal to a difference value Bs1-X between the first reference discharge current Bs1 and a predetermined value X, and the instantaneous discharge rate $\Delta Bd/t$ of the battery is higher than or equal to a first reference instantaneous discharge rate $\Delta Bd1/t$ at a point in time when the battery temperature Bt is measured (S11-1). The predetermined value X may be lower than the first reference discharge current Bs1. For example, the first reference discharge current Bs1 may be 20 A, the predetermined value X may be 10 A, and the difference value Bs1-X may be 10 A. The instantaneous discharge rate $\Delta Bd/t$ of the battery may be the amount of change in discharge current for a predetermined time (one second). In particular, the predetermined value X and the first reference instantaneous discharge rate $\Delta Bd1/t$ may be determined as values at which the instantaneous discharge current of the battery is expected to reach the first reference discharge current Bs1 after a predetermined time (one second).

When it is determined in S11-1 that the instantaneous discharge current Bs of the battery is higher than or equal to the first reference discharge current Bs1 or the instantaneous discharge rate $\Delta Bd/t$ of the battery is higher than or equal to the first reference instantaneous discharge rate $\Delta Bd1/t$, the controller 18 may turn off the electric heater 15 (S5).

When it is determined in S11-1 that the instantaneous discharge current Bs of the battery is lower than the first reference discharge current Bs1 and the instantaneous discharge rate $\Delta Bd/t$ of the battery is lower than the first reference instantaneous discharge rate $\Delta Bd1/t$, the controller 18 may turn on the electric heater 15 (S2).

According to an alternative exemplary embodiment, when it is determined in S11-1 that the instantaneous discharge current Bs of the battery is higher than or equal to the first reference discharge current Bs1 or the instantaneous discharge rate $\Delta Bd/t$ of the battery is higher than or equal to the first reference instantaneous discharge rate $\Delta Bd1/t$, it may be determined whether SoC Sk of the battery is lower than or equal to a first reference SoC Sk1 (S11-2). The first reference SoC Sk1 may be set to increase the AER of the vehicle as much as possible. For example, the first reference SoC Sk1 may be 40%.

When it is determined in S11-2 that the SoC Sk of the battery is lower than or equal to the first reference SoC Sk1, the controller 18 may turn off the electric heater 15 (S5). When the SoC Sk of the battery is lower than or equal to the first reference SoC Sk1, the electric heater 15 may be turned off so that the power consumption of the battery may be reduced and the AER of the vehicle may be increased to a maximum.

When it is determined in S11-2 that the SoC Sk of the battery is higher than the first reference SoC Sk1, the controller 18 may turn on the electric heater 15 (S2).

When it is determined in S11 that the battery temperature Bt exceeds the first reference temperature Bt1, it may be determined whether the battery temperature Bt is lower than or equal to the second reference temperature Bt2 (S12). The second reference temperature Bt2 may be higher than the first reference temperature Bt1. For example, the second reference temperature Bt2 may be 0° C.

According to an exemplary embodiment, when it is determined in S12 that the battery temperature Bt is lower than or equal to the second reference temperature Bt2, the instantaneous discharge current Bs of the battery is higher than or equal to a second reference discharge current Bs2 (S12-1). The second reference discharge current Bs2 may be a discharge current of the battery at which the battery efficiency Bn is reduced to be lower than or equal to the threshold efficiency Bh at the second reference temperature Bt2 or lower. For example, when the threshold efficiency Bh is 90%, the second reference discharge current Bs2 is 40 A, and the instantaneous discharge current Bs of the battery is lower than or equal to the second reference discharge current Bs2, the battery efficiency Bn may be lower than or equal to the threshold efficiency Bh.

According to another exemplary embodiment, when it is determined in S12 that the battery temperature Bt is lower than or equal to the second reference temperature Bt2, it may be determined whether the instantaneous discharge current Bs of the battery is higher than or equal to a difference value Bs2-X between the second reference discharge current Bs2 and a predetermined value X, and the instantaneous discharge rate $\Delta Bd/t$ of the battery is higher than or equal to a second reference instantaneous discharge rate $\Delta Bd2/t$ at a point in time when the battery temperature Bt is measured (S12-1). The predetermined value X may be lower than the second reference discharge current Bs2. For example, the second reference discharge current Bs2 may be 40 A, the predetermined value X may be 10 A, and the difference value Bs2-X may be 30 A. The instantaneous discharge rate $\Delta Bd/t$ of the battery may be the amount of change in discharge current for a predetermined time (one second). In particular, the predetermined value X and the second reference instantaneous discharge rate $\Delta Bd2/t$ may be determined as values at which the instantaneous discharge current of the battery is expected to reach the second reference discharge current Bs2 after one second.

When it is determined in S12-1 that the instantaneous discharge current Bs of the battery is higher than or equal to the second reference discharge current Bs2 or the instantaneous discharge rate $\Delta Bd/t$ of the battery is higher than or equal to the second reference instantaneous discharge rate $\Delta Bd2/t$, the controller 18 may turn off the electric heater 15 (S5).

When it is determined in S12-1 that the instantaneous discharge current Bs of the battery is lower than the second reference discharge current Bs2 and the instantaneous discharge rate $\Delta Bd/t$ of the battery is lower than the second reference instantaneous discharge rate $\Delta Bd2/t$, the controller 18 may turn on the electric heater 15 (S2).

According to an alternative exemplary embodiment, when it is determined in S12-1 that the instantaneous discharge current Bs of the battery is higher than or equal to the second reference discharge current Bs2 or the instantaneous discharge rate $\Delta Bd/t$ of the battery is higher than or equal to the second reference instantaneous discharge rate $\Delta Bd2/t$, it may be determined whether the SoC Sk of the battery is lower than or equal to a second reference SoC Sk2 (S12-2). The second reference SoC Sk2 may be set to increase the AER of the vehicle as much as possible. For example, the second reference SoC Sk2 may be 35%.

When it is determined in S12-2 that the SoC Sk of the battery is lower than or equal to the second reference SoC Sk2, the controller 18 may turn off the electric heater 15 (S5). When the SoC Sk of the battery is lower than or equal to the second reference SoC Sk2, the electric heater 15 may be turned off so that the power consumption of the battery may be reduced and the AER of the vehicle may be increased to a maximum.

When it is determined in S12-2 that the SoC Sk of the battery is higher than the second reference SoC Sk2, the controller 18 may turn on the electric heater 15 (S2).

When it is determined in S12 that the battery temperature Bt exceeds the second reference temperature Bt2, it may be determined whether the battery temperature Bt is lower than or equal to the third reference temperature Bt3 (S13). The third reference temperature Bt3 may be higher than the second reference temperature Bt2. For example, the third reference temperature Bt3 may be 10° C.

According to an exemplary embodiment, when it is determined in S13 that the battery temperature Bt is lower than or equal to the third reference temperature Bt3, it may be determined whether the instantaneous discharge current Bs of the battery is higher than or equal to a third reference discharge current Bs3 (S13-1). The third reference discharge current Bs3 may be a discharge current of the battery at which the battery efficiency Bn is reduced to be lower than or equal to the threshold efficiency Bh at the third reference temperature Bt3 or lower. For example, when the threshold efficiency Bh is 90%, the third reference discharge current Bs3 is 50 A, and the instantaneous discharge current Bs of the battery is lower than or equal to the third reference discharge current Bs3, the battery efficiency Bn may be lower than or equal to the threshold efficiency Bh.

According to another exemplary embodiment, when it is determined in S13 that the battery temperature Bt is lower than or equal to the third reference temperature Bt3, it may be determined whether the instantaneous discharge current Bs of the battery is higher than or equal to a difference value Bs3-X between the third reference discharge current Bs3 and a predetermined value X, and the instantaneous discharge rate $\Delta Bd/t$ of the battery is higher than or equal to a third reference instantaneous discharge rate $\Delta Bd3/t$ at a point in time when the battery temperature Bt is measured (S13-1). The predetermined value X may be lower than the third reference discharge current Bs3. For example, the third reference discharge current Bs3 may be 50 A, the predetermined value X may be 10 A, and the difference value Bs3-X may be 40 A. The instantaneous discharge rate $\Delta Bd/t$ of the battery may be the amount of change in discharge current for a predetermined time (one second). In particular, the predetermined value X and the third reference instantaneous discharge rate $\Delta Bd3/t$ may be determined as values at which the instantaneous discharge current of the battery is expected to reach the third reference discharge current Bs3 after one second.

When it is determined in S13-1 that the instantaneous discharge current Bs of the battery is higher than or equal to the third reference discharge current Bs3 or the instantaneous discharge rate $\Delta Bd/t$ of the battery is higher than or equal to the third reference instantaneous discharge rate $\Delta Bd3/t$, the controller 18 may turn off the electric heater 15 (S5).

When it is determined in S13-1 that the instantaneous discharge current Bs of the battery is lower than the third reference discharge current Bs3 and the instantaneous discharge rate $\Delta Bd/t$ of the battery is lower than the third reference instantaneous discharge rate $\Delta Bd3/t$, the controller 18 may turn on the electric heater 15 (S2).

According to an alternative exemplary embodiment, when it is determined in S13-1 that the instantaneous discharge current Bs of the battery is higher than or equal to the third reference discharge current Bs3 or the instantaneous discharge rate $\Delta Bd/t$ of the battery is higher than or equal to the third reference instantaneous discharge rate $\Delta Bd3/t$, it may be determined whether the SoC Sk of the battery is lower than or equal to a third reference SoC Sk3 (S13-2). The third reference SoC Sk3 may be set to increase the AER of the vehicle as much as possible. For example, the third reference SoC Sk3 may be 30%.

When it is determined in S13-2 that the SoC Sk of the battery is lower than or equal to the third reference SoC Sk3, the controller 18 may turn off the electric heater 15 (S5). When the SoC Sk of the battery is lower than or equal to the third reference SoC Sk3, the electric heater 15 may be turned off so that the power consumption of the battery may be reduced and the AER of the vehicle may be increased to a maximum.

When it is determined in S13-2 that the SoC Sk of the battery is higher than the third reference SoC Sk3, the controller 18 may turn on the electric heater 15 (S2).

When it is determined in S13 that the battery temperature Bt exceeds the third reference temperature Bt3, it may be determined whether the battery temperature Bt is lower than or equal to the fourth reference temperature Bt4 (S14). The fourth reference temperature Bt4 may be higher than the third reference temperature Bt3. For example, the fourth reference temperature Bt4 may be 25° C.

According to an exemplary embodiment, when it is determined in S14 that the battery temperature Bt is lower than or equal to the fourth reference temperature Bt4, it may be determined whether the instantaneous discharge current Bs of the battery is higher than or equal to a fourth reference discharge current Bs4 (S14-1). The fourth reference discharge current Bs4 may be a discharge current of the battery at which the battery efficiency Bn is reduced to be lower than or equal to the threshold efficiency Bh at the fourth reference temperature Bt4 or lower. For example, when the threshold efficiency Bh is 90%, the fourth reference discharge current Bs4 is 80 A, and the instantaneous discharge current Bs of the battery is lower than or equal to the fourth reference discharge current Bs4, the battery efficiency Bn may be lower than or equal to the threshold efficiency Bh.

According to another exemplary embodiment, when it is determined in S14 that the battery temperature Bt is lower than or equal to the fourth reference temperature Bt4, it may be determined whether the instantaneous discharge current Bs of the battery is higher than or equal to a difference value Bs4-X between the fourth reference discharge current Bs4 and a predetermined value X, and the instantaneous discharge rate $\Delta Bd/t$ of the battery is higher than or equal to a fourth reference instantaneous discharge rate $\Delta Bd4/t$ at a point in time when the battery temperature Bt is measured (S14-1). The predetermined value X may be lower than the fourth reference discharge current Bs4. For example, the fourth reference discharge current Bs4 may be 80 A, the predetermined value X may be 10 A, and the difference value Bs4-X may be 70 A. The instantaneous discharge rate $\Delta Bd/t$ of the battery may be the amount of change in discharge current for a predetermined time (one second). In particular, the predetermined value X and the fourth reference instantaneous discharge rate $\Delta Bd4/t$ may be determined as values at which the instantaneous discharge current of the battery is expected to reach the fourth reference discharge current Bs4 after one second.

When it is determined in S14-1 that the instantaneous discharge current Bs of the battery is higher than or equal to the fourth reference discharge current Bs4 or the instantaneous discharge rate $\Delta Bd/t$ of the battery is higher than or equal to the fourth reference instantaneous discharge rate $\Delta Bd4/t$, the controller 18 may turn off the electric heater 15 (S5).

When it is determined in S14-1 that the instantaneous discharge current Bs of the battery is lower than the fourth reference discharge current Bs4 and the instantaneous discharge rate $\Delta Bd/t$ of the battery is lower than the fourth reference instantaneous discharge rate $\Delta Bd4/t$, the controller 18 may turn on the electric heater 15 (S2).

According to an alternative exemplary embodiment, when it is determined in S14-1 that the instantaneous discharge current Bs of the battery is higher than or equal to the fourth reference discharge current Bs4 or the instantaneous discharge rate $\Delta Bd/t$ of the battery is higher than or equal to the fourth reference instantaneous discharge rate $\Delta Bd4/t$, it may be determined whether the SoC Sk of the battery is lower than or equal to a fourth reference SoC Sk4 (S14-2). The fourth reference SoC Sk4 may be set to increase the AER of the vehicle as much as possible. For example, the fourth reference SoC Sk4 may be 25%.

When it is determined in S14-2 that the SoC Sk of the battery is lower than or equal to the fourth reference SoC Sk4, the controller 18 may turn off the electric heater 15 (S5). When the SoC Sk of the battery is lower than or equal to the fourth reference SoC Sk4, the electric heater 15 may be turned off so that the power consumption of the battery may be reduced and the AER of the vehicle may be increased to a maximum.

When it is determined in S14-2 that the SoC Sk of the battery is higher than the fourth reference SoC Sk4, the controller 18 may turn on the electric heater 15 (S2).

When it is determined in S14 that the battery temperature Bt exceeds the fourth reference temperature Bt4, it may be determined whether the battery temperature Bt is lower than or equal to the fifth reference temperature Bt5 (S15). The fifth reference temperature Bt5 may be higher than the fourth reference temperature Bt4. For example, the fifth reference temperature Bt5 may be 35° C. The fifth reference temperature Bt5 may be a maximum reference temperature which is the highest temperature among the plurality of reference temperatures Bt1, Bt2, Bt3, Bt4, and Bt5. For example, the maximum reference temperature may be the same as or be slightly lower than the threshold battery temperature Bt_limit.

According to an exemplary embodiment, when it is determined in S15 that the battery temperature Bt is lower than or equal to the fifth reference temperature Bt5, it may be determined whether the instantaneous discharge current Bs of the battery is higher than or equal to a fifth reference discharge current Bs5 (S15-1). The fifth reference discharge current Bs5 may be a discharge current of the battery at which the battery efficiency Bn is reduced to be lower than or equal to the threshold efficiency Bh at the fifth reference temperature Bt5 or lower. For example, when the threshold efficiency Bh is 90%, the fifth reference discharge current Bs5 is 100 A, and the instantaneous discharge current Bs of the battery is lower than or equal to the fifth reference discharge current Bs5, the battery efficiency Bn may be lower than or equal to the threshold efficiency Bh.

According to another exemplary embodiment, when it is determined in S15 that the battery temperature Bt is lower than or equal to the fifth reference temperature Bt5, it may be determined whether the instantaneous discharge current Bs of the battery is higher than or equal to a difference value Bs5-X between the fifth reference discharge current Bs5 and a predetermined value X, and the instantaneous discharge rate $\Delta Bd/t$ of the battery is higher than or equal to a fifth reference instantaneous discharge rate $\Delta Bd5/t$ at a point in time when the battery temperature Bt is measured (S15-1). The predetermined value X may be lower than the fifth reference discharge current Bs5. For example, the fifth reference discharge current Bs5 may be 100 A, the predetermined value X may be 10 A, and the difference value Bs5-X may be 90 A. The instantaneous discharge rate $\Delta Bd/t$ of the battery may be the amount of change in discharge current for a predetermined time (one second). In particular, the predetermined value X and the fifth reference instantaneous discharge rate $\Delta Bd5/t$ may be determined as values at which the instantaneous discharge current of the battery is expected to reach the fifth reference discharge current Bs5 after one second.

When it is determined in S15-1 that the instantaneous discharge current Bs of the battery is higher than or equal to the fifth reference discharge current Bs5 or the instantaneous discharge rate $\Delta Bd/t$ of the battery is higher than or equal to the fifth reference instantaneous discharge rate $\Delta Bd5/t$, the controller 18 may turn off the electric heater 15 (S5).

When it is determined in S15-1 that the instantaneous discharge current Bs of the battery is lower than the fifth reference discharge current Bs5 and the instantaneous discharge rate $\Delta Bd/t$ of the battery is lower than the fifth reference instantaneous discharge rate $\Delta Bd5/t$, the controller 18 may turn on the electric heater 15 (S2).

According to an alternative exemplary embodiment, when it is determined in S15-1 that the instantaneous discharge current Bs of the battery is higher than or equal to the fifth reference discharge current Bs5 or the instantaneous discharge rate $\Delta Bd/t$ of the battery is higher than or equal to the fifth reference instantaneous discharge rate $\Delta Bd5/t$, it may be determined whether the SoC Sk of the battery is lower than or equal to a fifth reference SoC Sk5 (S15-2). The fifth reference SoC Sk5 may be set to increase the AER of the vehicle as much as possible. For example, the fifth reference SoC Sk5 may be 25%.

When it is determined in S15-2 that the SoC Sk of the battery is lower than or equal to the fifth reference SoC Sk5, the controller 18 may turn off the electric heater 15 (S5). When the SoC Sk of the battery is lower than or equal to the fifth reference SoC Sk5, the electric heater 15 may be turned off so that the power consumption of the battery may be reduced and the AER of the vehicle may be increased to a maximum.

When it is determined in S15-2 that the SoC Sk of the battery is higher than the fifth reference SoC Sk5, the controller 18 may turn on the electric heater 15 (S2).

As set forth above, the method for controlling an electric heater of an HVAC system according to exemplary embodiments of the present disclosure may be designed to turn off the electric heater when the battery efficiency becomes lower than or equal to the threshold efficiency in the state in which the HVAC system operates in the heating mode and the electric heater is turned on, thereby relatively reducing the discharge amount of the battery and maximizing the overall battery efficiency while the vehicle is driving. In the heating condition of the HVAC system, the energy efficiency of the vehicle may be improved, and the AER of the vehicle may be increased.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A method for controlling an electric heater of a vehicular heating, ventilation, and air conditioning (HVAC) system, the method comprising:
   turning on, by a controller, the electric heater;
   determining whether an ambient air temperature of a vehicle is higher than or equal to a threshold ambient air temperature, and a battery temperature is lower than or equal to a threshold battery temperature;
   determining whether battery efficiency is lower than or equal to threshold efficiency; and
   turning off the electric heater when the battery efficiency is lower than or equal to the threshold efficiency, and keeping the electric heater on when the battery efficiency is not lower than or equal to the threshold efficiency;

wherein the electric heater is configured to receive electric energy from the battery; and wherein determining whether the battery efficiency is lower than or equal to the threshold efficiency comprises comparing the battery temperature with a plurality of reference temperatures and comparing an instantaneous discharge current of the battery with a plurality of reference discharge currents.

2. The method according to claim 1, wherein the battery efficiency is classified based on the plurality of reference temperatures, the plurality of reference temperatures are divided from a minimum reference temperature to a maximum reference temperature, and the maximum reference temperature is lower than or equal to the threshold battery temperature.

3. The method according to claim 1, wherein the plurality of reference discharge currents correspond to the plurality of reference temperatures.

4. The method according to claim 1, wherein the electric heater is turned off when the battery temperature is lower than or equal to each reference temperature, and the instantaneous discharge current of the battery is higher than or equal to a reference discharge current corresponding to each reference temperature, and wherein the electric heater is not turned off when the battery temperature is not lower than or equal to each reference temperature, and the instantaneous discharge current of the battery is not higher than or equal to a reference discharge current corresponding to each reference temperature.

5. The method according to claim 1, further comprising determining whether a state of charge (SoC) of the battery is lower than or equal to a reference SoC, and wherein the electric heater is turned off when the SoC of the battery is lower than or equal to the reference SoC, and the electric heater is not turned off when the SoC of the battery is not lower than or equal to the reference SoC.

6. The method according to claim 1, wherein determining whether the battery efficiency is lower than or equal to the threshold efficiency comprises comparing the battery temperature with a plurality of reference temperatures and comparing an instantaneous discharge rate of the battery with a plurality of reference instantaneous discharge rates.

7. The method according to claim 6, wherein the plurality of reference instantaneous discharge rates correspond to the plurality of reference temperatures.

8. The method according to claim 6, wherein the electric heater is turned off when the battery temperature is lower than or equal to each reference temperature, and the instantaneous discharge rate of the battery is higher than or equal to a reference instantaneous discharge rate corresponding to each reference temperature, and wherein the electric heater is not turned off when the battery temperature is not lower than or equal to each reference temperature, and the instantaneous discharge rate of the battery is not higher than or equal to a reference instantaneous discharge rate corresponding to each reference temperature.

9. The method according to claim 6, further comprising determining whether a state of charge (SoC) of the battery is lower than or equal to a reference SoC, and wherein the electric heater is turned off when the SoC of the battery is lower than or equal to the reference SoC, and the electric heater is not turned off when the SoC of the battery is not lower than or equal to the reference SoC.

10. The method according to claim 1, further comprising determining whether a heating condition of the HVAC system corresponds to a warm-up condition or a stable condition after the electric heater is turned off.

11. The method according to claim 10, wherein the warm-up condition is a condition in which a temperature change rate of supply air, which is supplied to a passenger compartment by the HVAC system, is higher than or equal to a reference temperature change rate.

12. The method according to claim 10, further comprising determining whether a temperature increase rate of supply air, which is supplied to a passenger compartment by the HVAC system, is lower than or equal to a threshold temperature increase rate; and turning on the electric heater when the temperature increase rate of the supply air is lower than or equal to the threshold temperature increase rate, and not turning on the electric heater when the temperature increase rate of the supply air is not lower than or equal to the threshold temperature increase rate.

13. The method according to claim 10, wherein the stable condition is a condition in which a temperature change rate of supply air, which is supplied to a passenger compartment by the HVAC system, is lower than a reference temperature change rate.

14. The method according to claim 10, further comprising determining whether a temperature decrease rate of supply air, which is supplied to a passenger compartment by the HVAC system, is higher than or equal to a threshold temperature decrease rate; and turning on the electric heater when the temperature decrease rate of the supply air is higher than or equal to the threshold temperature decrease rate, and not turning on the electric heater when the temperature decrease rate of the supply air is not higher than or equal to the threshold temperature decrease rate.

\* \* \* \* \*